United States Patent [19]

Eguchi

[11] Patent Number: 5,554,969

[45] Date of Patent: Sep. 10, 1996

[54] DIAGNOSING APPARATUS AND METHOD FOR DETECTING FAILURE IN SENSOR APPLICABLE TO MOTOR-DRIVEN VEHICULAR REAR ROAD WHEEL STEERING SYSTEM

[75] Inventor: Takaaki Eguchi, Isehara, Japan

[73] Assignee: Nissan Motor Co., Ltd., Yokohama, Japan

[21] Appl. No.: 376,916

[22] Filed: Jan. 23, 1995

[30] Foreign Application Priority Data

Feb. 2, 1994 [JP] Japan .................................. 6-010772

[51] Int. Cl.$^6$ .............................. B60Q 1/00; G06F 7/70
[52] U.S. Cl. ....................... 340/438; 340/440; 340/671;
364/424.03; 364/424.05; 180/236; 180/404;
180/412; 180/446; 180/242
[58] Field of Search ........................... 340/438, 439,
340/440, 671, 672, 679; 364/424.03, 424.01,
424.05; 180/79.1, 140, 141, 142, 148, 154,
236, 234, 242; 280/91

[56] References Cited

U.S. PATENT DOCUMENTS

| | | | |
|---|---|---|---|
| 4,961,144 | 10/1990 | Yabe et al. | 364/424.05 |
| 5,048,627 | 9/1991 | Eguchi et al. | 364/424.05 |
| 5,200,911 | 4/1993 | Ishikawa et al. | 364/424.05 |
| 5,257,191 | 10/1993 | Takehara et al. | 364/424.05 |
| 5,313,389 | 5/1994 | Yasui | 364/424.05 |

FOREIGN PATENT DOCUMENTS 63-82875  4/1988  Japan .

*Primary Examiner*—Donnie L. Crosland
*Attorney, Agent, or Firm*—Foley & Lardner

[57] ABSTRACT

A diagnosing apparatus and method for determining an occurrence of failure in a rear road wheel steering angle sensor of a motor-driven four wheel steering system of an automotive vehicle which can achieve a highly accurate detection of the occurrence of failure in the single rear road wheel steering angle sensor at an appropriate timing irrespective of a sensor failure mode. The detection of failure in the rear road wheel steering angle sensor is carried out on the basis of whether a target deviation between a rear road wheel steering angle sensor value and a target rear road wheel steering angle exceeds a predetermined deviation value and whether a generation time duration during which the target deviation exceeds the predetermined deviation value has continued over a predetermined period of time. In addition, the detection of failure in the rear road wheel steering angle sensor is carried out on the basis of whether an accumulated value of a rear road wheel steering angle estimated deviation $\int\Delta\delta\#$ exceeds a predetermined threshold value a when such conditions as a monotonous variation in a servo current applied to the motor in the four wheel steering system, a monotonous variation in a rear road wheel steering angle estimated deviation, and same directional monotonous variations in the servo current and in the rear road wheel steering angle estimated deviation are satisfied.

12 Claims, 8 Drawing Sheets

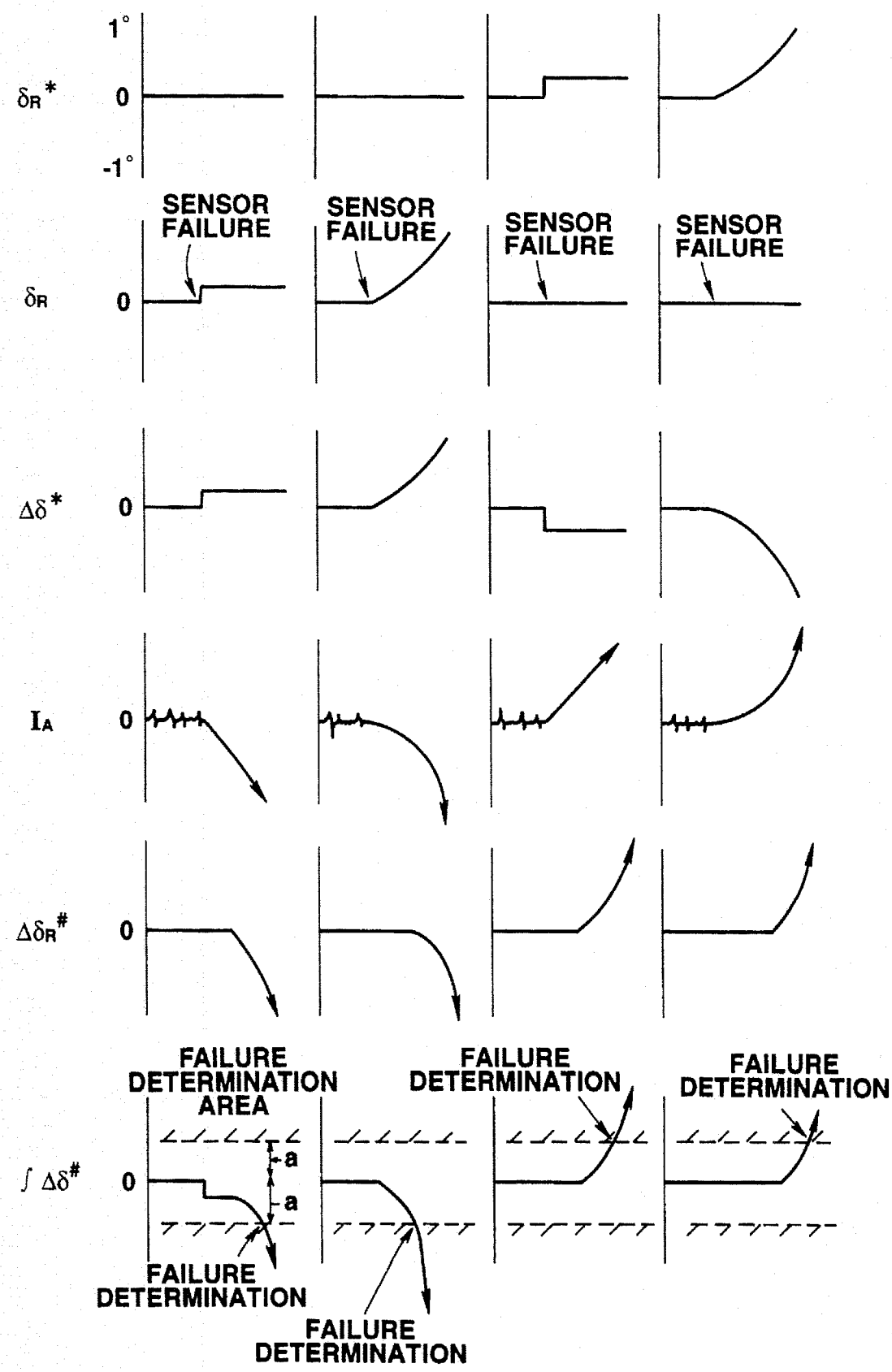

DIAGNOSING APPARATUS AND METHOD FOR DETECTING FAILURE IN SENSOR APPLICABLE TO MOTOR-DRIVEN VEHICULAR REAR ROAD WHEEL STEERING SYSTEM

BACKGROUND OF THE INVENTION

1. Field of The Invention

The present invention relates to a diagnosing apparatus and method for detecting an occurrence of failure in a rear road wheel steering angle sensor applicable to a motor driven four road wheel power steering system which controls a rear road wheel steering angle by means of an electric motor.

2. Description of Background Art

A Japanese Patent Application First Publication No. Showa 63-82875 published on Apr. 13, 1988 exemplifies a previously proposed motor driven power assisted steering system in which an occurrence in failure of a steering angle sensor used in a power assisted control for the steering of front road wheels and whose output signal is used as a positioning feedback information.

In the above-identified Japanese Patent Application Publication, two of main and sub steering angle sensors are used, a change rate of each output signal of the main and sub steering angle sensors is calculated, and a determination of occurrence of failure in either of the two steering angle sensors which indicates a minimum change rate when a difference occurs in the change rate between output signals of the respective steering angle sensors. In addition, when the output signal of either of the two steering angle sensors exceeds a predetermined range, the determination of occurrence of failure in either of the steering angle sensors whose output signal exceeds the predetermined range is carried out.

However, since the steering angle sensors are such a duplex system configuration that one of the two steering angle sensors is used as the main steering angle sensor to perform a servo control for the electric motor and the other steering angle sensor is used as the sub steering angle sensor to monitor the occurrence of failure, the duplex system configuration of the above-described power assisted steering control system worsens a cost effectiveness.

SUMMARY OF THE INVENTION

It is an object of the present invention to provide a diagnosing apparatus and method for detecting an occurrence of failure in a single rear road wheel steering angle sensor applicable to a motor driven four road wheel steering system in which the single rear road wheel steering angle sensor is cost effectively used, in which a determination of failure in the single rear road wheel steering angle sensor is carried out without erroneous determination of occurrence of failure at an appropriate timing according to a level of an output signal of the rear road wheel steering angle sensor when the rear road wheel steering angle sensor has failed, in which an accurate determination of occurrence in failure of the rear road wheel steering angle sensor is carried out even when such a minor offset as abnormal output signal deviation from the normal value of the output signal of the rear road wheel steering angle sensor occurs, and/or in which the determination of occurrence of failure in the rear road wheel steering angle sensor is speedily and accurately carried out for any mode of failures including an occurrence of a minor deviation in a rear road wheel steering angle target deviation.

The above-described object can be achieved by providing an apparatus for an automotive vehicle, comprising: a) an electric motor; b) a rear road wheel steering mechanism which is interposed between said motor and rear left and right road wheels of the vehicle and which is so constructed as to steer left and right road wheels of the vehicle through a rear road wheel steering angle in response to a rotation of said motor; c) detecting means for detecting an information related to a vehicular behavior condition; d) a rear road wheel steering angle sensor which is so constructed as to produce a sensor signal indicating a direction and magnitude of the rear road wheel steering angle said sensor signal being used as a positioning information of the rear road wheel steering angle to be controlled; e) rear road wheel steering angle target value calculating means for calculating a rear road wheel steering angle target value according to the detected information related to the vehicular behavior condition; f) rear road wheel steering angle target value deviation calculating means for calculating a target deviation value between the sensor signal value and the calculated rear road wheel angle target value; g) controlling means for outputting a servo current to said motor to rotate said motor so that the calculated target deviation gives zero; h) sensor failure determination area setting means for setting a sensor failure determination area represented by such a relationship between a magnitude of the target deviation and a generation time duration during which the target deviation continues that as the magnitude of the target deviation becomes larger, the generation time duration becomes shorter; i) first sensor monitoring means for monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area; and i) warning means for warning the occurrence of failure in the rear road wheel steering angle sensor when said first sensor monitoring means determines that the failure occurs in the rear road wheel steering angle sensor.

The above-described object can also be achieved by providing an apparatus for an automotive vehicle, comprising: a) an electric motor; b) a rear road wheel steering mechanism which is interposed between said motor and rear left and right road wheels of the vehicle and which is so constructed as to steer left and right road wheels of the vehicle through a rear road wheel steering angle in response to a rotation of said motor; c) detecting means for detecting an information related to a vehicular behavior condition; d) a rear road wheel steering angle sensor which is so constructed as to produce a sensor signal indicating a direction and magnitude of the rear road wheel steering angle said sensor signal being used as a positioning information of the rear road wheel steering angle to be controlled; e) rear road wheel steering angle target value calculating means for calculating a rear road wheel steering angle target value according to the detected information related to the vehicular behavior condition; f) rear road wheel steering angle target value deviation calculating means for calculating a target deviation value between the sensor signal value and the calculated rear road wheel angle target value; g) controlling means for outputting a servo current to said motor to rotate said motor so that the calculated target deviation gives zero; h) rear road wheel steering angle estimating means for calculating a rear road wheel steering angle estimated value of the rear road wheel steering angle provided through the rear road wheel steering mechanism when said servo current is supplied to the electric motor on the basis of a dynamic characteristic of the motor: i) rear road wheel steering angle estimated deviation calculating means for calculating an estimated deviation between the rear road wheel steering angle sensor signal value and the estimated value of the rear road wheel steering angle; j) servo current variation determining means for determining whether said servo current has monotonously varied; k) rear road wheel steering angle estimated deviation variation determining means for determining whether said estimated deviation is monotonously varied; l) variation direction determining means for determining whether directions of the respective variations in the servo current and estimated deviation are mutually the same; m) rear road wheel steering angle estimated deviation accumulating means for accumulating a change rate of the rear road wheel steering angle estimated deviation when such conditions as the monotonous variations in said servo current and in the rear road wheel steering angle estimated deviation and as the mutually same directional variations in the servo current and the estimated deviation are satisfied: n) second sensor monitoring means for determining an occurrence of failure in the rear road wheel steering angle sensor when an accumulated value of the change rate of the rear road wheel steering angle estimated deviation is equal to or larger than a predetermined threshold value; and n) warning means for warning the occurrence of failure in the rear road wheel steering angle sensor when said second sensor monitoring means determines that the failure in the rear road wheel steering angle sensor has occurred.

The above-described object can also be achieved by providing an apparatus for an automotive vehicle, comprising: a) an electric motor; b) a rear road wheel steering mechanism which is interposed between said motor and rear left and right road wheels of the vehicle and which is so constructed as to steer left and right road wheels of the vehicle through a rear road wheel steering angle in response to a rotation of said motor; c) detecting means for detecting an information related to a vehicular behavior condition; d) a rear road wheel steering angle sensor which is so constructed as to produce a sensor signal indicating a direction and magnitude of the rear road wheel steering angle said sensor signal being used as a positioning information of the rear road wheel steering angle to be controlled; e) rear road wheel steering angle target value calculating means for calculating a rear road wheel steering angle target value according to the detected information related to the vehicular behavior condition; f) rear road wheel steering angle target value deviation calculating means for calculating a target deviation value between the sensor signal value and the calculated rear road wheel angle target value; g) controlling means for outputting a servo current to said motor to rotate said motor so that the calculated target deviation gives zero; h) sensor failure determination area setting means for setting a sensor failure determination area represented by such a relationship between a magnitude of the target deviation and a generation time duration during which the target deviation continues that as the magnitude of the target deviation becomes larger, the generation time duration becomes shorter; i) first sensor monitoring means for monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area; j) rear road wheel steering angle estimating means for calculating a rear road wheel steering angle estimated value of the rear road wheel steering angle provided through the rear road wheel steering mechanism when said servo current is supplied to the electric motor on the basis of a dynamic characteristic of the motor; k) rear road wheel steering angle estimated deviation calculating means for calculating an estimated deviation between the rear road wheel steering angle sensor signal value and the estimated value of the rear road wheel steering angle; l) servo current variation determining means for determining whether said servo current has monotonously varied; m) rear road wheel steering angle estimated deviation variation determining means for determining whether said estimated deviation is monotonously varied; n) variation direction determining means for determining whether directions of the respective variations in the servo current and estimated deviation are mutually the same; o) rear road wheel steering angle estimated deviation accumulating means for accumulating a change rate off the rear road wheel steering angle estimated deviation when such conditions as the monotonous variations in said servo current and in the rear road wheel steering angle estimated deviation and as the mutually same directional variations in the servo current and the estimated deviation are satisfied; p) second sensor monitoring means for determining an occurrence of failure in the rear road wheel steering angle sensor when an accumulated value of the change rate of the rear road wheel steering angle estimated deviation is equal to or larger than a predetermined threshold value; and q) warning means for warning the occurrence of failure in the rear road wheel steering angle sensor when at least one of said first and second sensor monitoring means determines that the failure in the rear road wheel steering angle sensor has occurred.

The above-described object can also be achieved by providing a diagnosing method for a motor-driven four wheel steering system of an automotive vehicle, comprising the steps of: a) detecting an information related to a vehicular behavior condition; b) producing a sensor signal indicating a direction and magnitude of a rear road wheel steering angle, said sensor signal being used as a positioning information of the rear road wheel steering angle to be controlled; c) calculating a rear road wheel steering angle target value according to the detected information related to the vehicular behavior condition; d) calculating a target deviation value between the sensor signal value and the calculated rear road wheel angle target value; e) outputting a servo current to said motor to rotate said motor so that the calculated target deviation gives zero; f) setting a sensor failure determination area represented by such a relationship between a magnitude of the target deviation and a generation time duration during which the target deviation continues that as the magnitude of the target deviation becomes larger, the generation time duration becomes shorter; g) monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area; and h) warning the occurrence of failure in the rear road wheel steering angle sensor when said first sensor monitoring means determines that the failure occurs in the rear road wheel steering angle sensor.

The above-described object can also be achieved by providing a diagnosing method for a motor-driven four wheel steering system of an automotive vehicle, comprising the steps of: a) detecting an information related to a vehicular behavior condition; b) producing a sensor signal indicating a direction and magnitude of a rear road wheel steering angle, said sensor signal being used as a positioning information of the rear road wheel steering angle to be controlled; c) calculating a rear road wheel steering angle target value according to the detected information related to the vehicular behavior condition; d) calculating a target deviation value between the sensor signal value and the calculated rear road wheel angle target value; e) outputting a servo current to said motor to rotate said motor so that the calculated target deviation gives zero; f) calculating a rear road wheel steering angle estimated value of the rear road wheel steering angle provided through a rear road wheel steering mechanism when said servo current is supplied to the electric motor on the basis of a dynamic characteristic of the motor; g) calculating an estimated deviation between the rear road wheel steering angle sensor signal value and the estimated value of the rear road wheel steering angle; h) determining whether said servo current has monotonously varied: i) determining whether said estimated deviation is monotonously varied; j) determining whether directions of the respective variations in the servo current and estimated deviation are mutually the same; k) accumulating a change rate of the rear road wheel steering angle estimated deviation when such conditions as the monotonous variations in said servo current and in the rear road wheel steering angle estimated deviation and as the mutually same directional variations in the servo current and the estimated deviation are satisfied; l) determining an occurrence of failure in the rear road wheel steering angle sensor when an accumulated value of the change rate of the rear road wheel steering angle estimated deviation is equal to or larger than a predetermined threshold value; and n) warning the occurrence of failure in the rear road wheel steering angle sensor when said second sensor monitoring means determines that the failure in the rear road wheel steering angle sensor has occurred.

BRIEF DESCRIPTION OF THE DRAWINGS

FIGS. 9A through 9D are signal timing charts representing variations in specific values of the signals for each of the possible modes of failures in the rear road wheel steering angle sensor.

BEST MODE CARRYING OUT THE INVENTION

Reference will hereinafter be made to the drawings in order to facilitate a better understanding of the present invention.

Before explaining the present invention, another solution off problem in the case of the present invention will be described below.

Suppose that only one steering angle sensor is installed which is used to perform the servo control for a motor and from an output signal of the single steering angle sensor an occurrence of failure in the single steering angle sensor is determined using a failure detecting technique disclosed in a Japanese Patent Application First Publication No. Showa 63-82875 described in the BACKGROUND OF THE INVENTION.

Then, the determination of occurrence of failure can be carried out only when a zero output signal from the single steering angle sensor is continued for a long period of time due to a broken line in the steering angle sensor and a maximum output signal therefrom is continued for the long period of time due to a short-circuiting in the steering angle sensor.

In this way, the abnormality mode (failure mode is restricted only to the broken-line failure and the short-circuiting failure and the occurrence of failure in the steering angle sensor can be determined and informed only after a considerable time has passed from a time at which the failure has occurred in order to prevent an erroneous determination of occurrence of failure.

That is to say, since a non-intentional vehicular behavior is brought out due to the failure in the rear road wheel steering angle sensor in the motor driven four road wheel steering system of the vehicle, an accurate determination of occurrence in failure at an earlier possible timing after the actual occurrence of failure in the rear road wheel steering angle sensor with no erroneous determination of occurrence of failure is demanded for every mode of failure in the sensor including an offset abnormality of a sensor output signal. However, the technique of detecting the occurrence of failure described above does not meet the demand. It can be said that the present invention does meet this demand.

Figure 1:
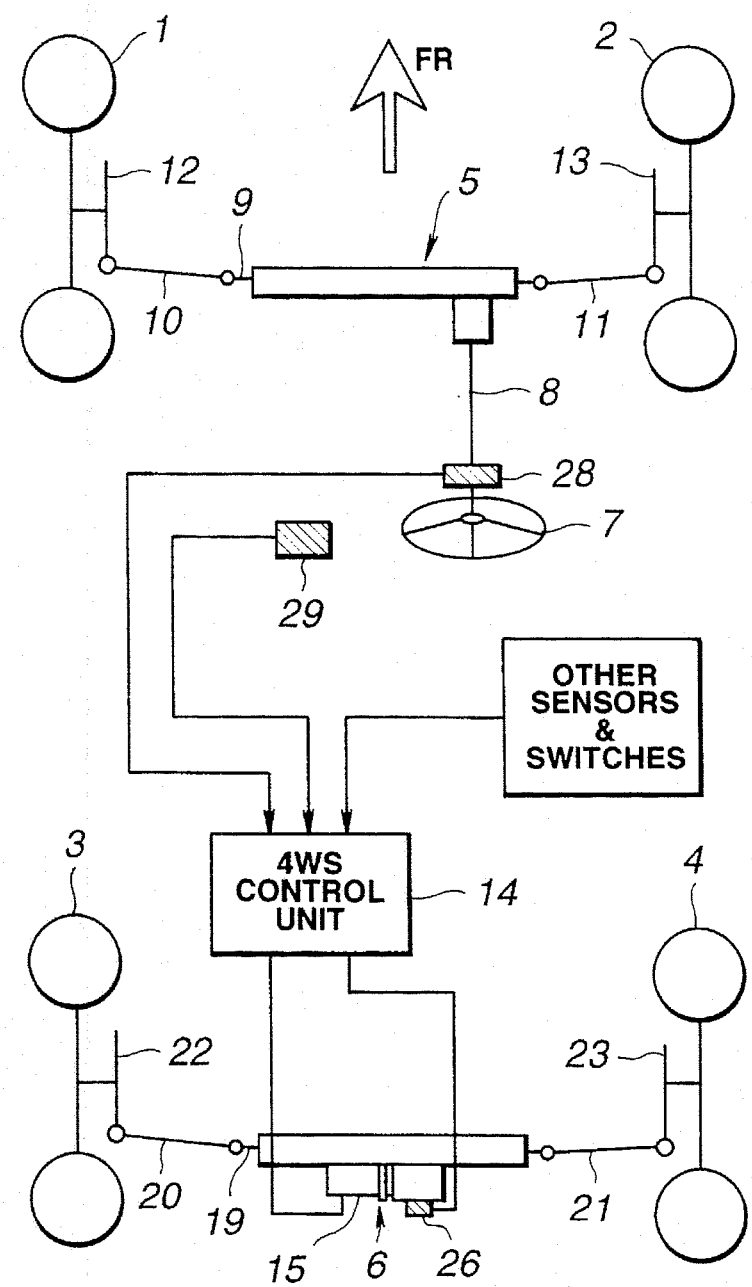
FIG. 1 is a schematic circuit block diagram of a motor driven four road wheel steering system to which an apparatus and method for detecting an occurrence of failure in a rear road wheel steering angle sensor is applicable.

FIG. 1 shows a whole circuit block diagram of a motor driven four road wheel steering system mounted an automotive vehicle to which the present invention is applicable.

Figure 2:
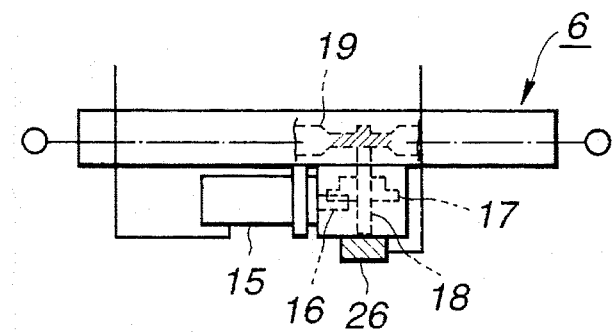
FIG. 2 is a schematic partially cross sectional view of a motor driven rear road wheel steering mechanism to which an output axle of an electric motor shown in FIG. 1 is connected.

FIG. 2 shows a partially cross sectional view of a rear road wheel steering mechanism to which an electric motor shown in FIG. 1 is connected.

Figure 3:
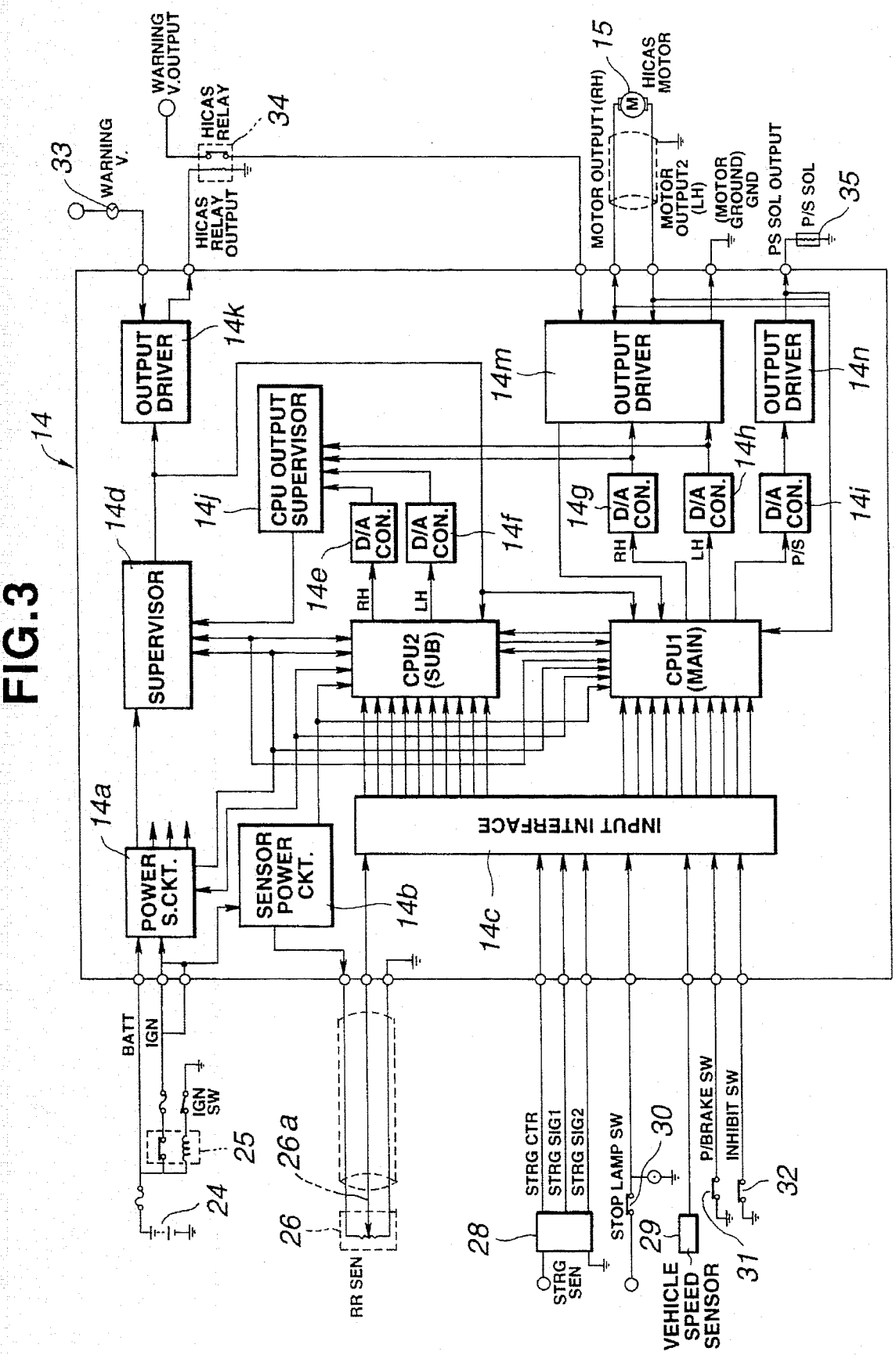
FIG. 3 is a schematic system configuration of the motor driven four road wheel steering system shown in FIG. 1 to which a first embodiment of the rear road wheel steering angle sensor failure detecting apparatus according to the present invention is applicable.

FIG. 3 shows an electronic control unit and its peripheral circuit of the motor driven four road wheel steering system shown in FIG. 1.

In FIG. 1, a mechanical front road wheel steering mechanism 5 connected to a steering wheel 7 via a steering shaft 8 and connected to front left and right road wheels 1 and 2 via knuckle arms 12 and 13 and side rods 10 and 11.

The mechanical front road wheel steering mechanism 5 is arranged such that the steering angle input from a steering wheel 7 via the steering shaft 8 is increased by means of a power steering (not shown) and the increased steering angle is transmitted from a rack shaft 9 to the front left and right road wheels 1 and 2 via the side rods 10 and 11 and knuckle arms 12 and 13 so as to provide the increased steering angle for each front road wheel.

A rear road wheel steering mechanism 6 is shown in FIG. 2. A 4WS (four wheel steering) control unit 14 reduces a speed derived from a rotational force of a HICAS (High Capacity Active-Controlled Suspension) motor controlled according to a motor output of the 4WS control unit 14 by means of a worm 16 and worm wheel 17. A rotational motion of the worm wheel 17 is converted into a linear motion of a rack shaft 19 by means of a mesh between a gear portion of a pinion shaft 18 and a rack shaft 19. The linear motion of the rack shaft 19 is transmitted to rear (left and right) road wheels 3 and 4 via side rods 20 and 21 and knuckle arms 22 and 23.

The 4WS control unit 14 includes, as shown in FIG. 3, a power supply circuit 14a, a sensor power supply circuit 14b, an input interface circuit 14c, a CPU (Central Processing Unit) 1, a CPU2, a monitoring circuit 14d, an D/A (Digital to Analog) converters 14e, 14f, 14g, 14h, and 14i, CPU monitoring circuit 14j, a relay output driver 14k, a motor output driver 14m, and a power steering solenoid output driver 14n.

The power supply circuit 14a directly receives a vehicular battery power supply 24 and indirectly receives an ignition power supply of the battery 24 via an ignition switch 25.

The input interface circuit 14c receives a sensor output signal from a rear steering angle sensor 26. The rear road wheel steering angle sensor 26 comprises a potentiometer, as shown in FIG. 3, whose one end receives, for example, +12 volts from the sensor power supply circuit 14b, whose other end is grounded, the ground potential being herein set as, for example, −12 volts, and whose tap 26a is variably moved according to a rotation of the output axle of the HICAS motor 15.

The input interface circuit 14c receives another sensor signal of a steering angle sensor 28 disposed on the steering shaft 8 so as to detect a steering angular displacement of the steering wheel 7.

The input interface circuit 14c receives another sensor signal of a vehicle speed sensor 29 and switch signals from a stop lamp switch 30, a brake switch 31, and an inhibitor switch 32. It is noted that the rear steering angle sensor 26 serves to detect a rotation quantity (direction and magnitude) of the pinion shaft 18 of the rear road wheel steering mechanism, i.e., the rotation quantity of the motor 15 and its sensor output signal is used to control the rear road wheel steering angle as a feedback information of positioning the rear road wheels 3 and 4.

The relay output driver 14k receives a monitoring output from the monitoring circuit 14d and a warning valve output from a warning valve 33 and transmits a HICAS relay output to a HICAS relay 34 so as to stop the HICAS motor 15.

The motor output driver 14m is driven according to the motor power supply via the HICAS relay 34 and receives a rear road wheel steering command via D/A converters 14g and 14h from the CPU1 and outputs a motor output signal to the HICAS motor 15 so as to rotate the output axle of the HICAS motor 15 according to the content of the rear road wheel steering command.

The power steering solenoid output driver 14n receives a power steering command from the CPU1 via the corresponding D/A converter 14i and outputs a power steering solenoid output to a power steering solenoid 35. The power steering solenoid 35 is installed in the mechanical front power steering mechanism 5 so as to vary the assisted power of the front steering mechanism 5 according to the vehicle speed (this is called as a vehicle speed responsive electronically controlled power steering system (EPS).

Next, an operation of the detecting (diagnosing) apparatus and method for the rear road wheel steering angle sensor of the four wheel steering system shown in FIGS. 1, 2, and 3 will be described below.

Rear Road Wheel Steering Angle Control Operation

Figure 4:
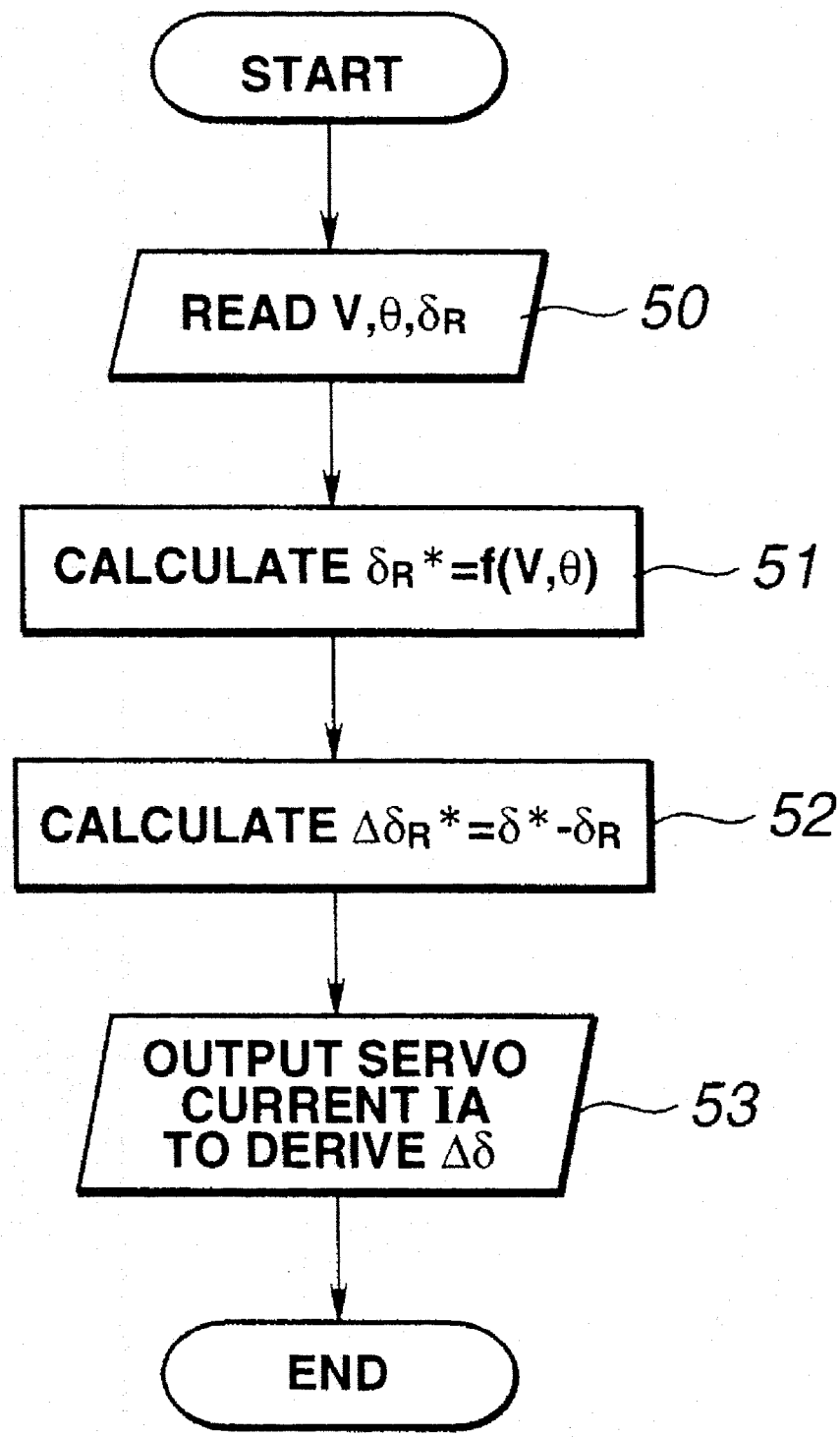
FIG. 4 is an operational flowchart of a rear road wheel steering angle control operation executed by a CPU1 and CPU2 shown in FIG. 3.

FIG. 4 shows an operational flowchart executed by the CPU1 and CPU2 of the 4WS control unit 14 and carried out whenever a predetermined control period is passed.

At a step 50, the CPU1 and CPU2 read the vehicle speed V from the vehicle speed sensor 28, the steering angle θ of the steering angle sensor 28, and the rear steering angle sensor value $\delta_R$ from the rear steering angle sensor 26.

At a step 51, the CPU1 and CPU2 calculate the target rear road wheel steering angle $\delta_R\#$ from the vehicle speed V and steering angle θ. The target rear steering wheel angle $\delta_R\#$ is derived from, such a phase inversion control rule as a case where, for example, the rear road wheels are instantaneously steered to an opposite phase to the phase of the front road wheel steering angle so as to positively provide the vehicle body for a yaw motion, thus securing an initial cornering force characteristic and, thereafter, the phase of the rear road steering angle is inverted so as to be in phase with the front road steering angle so as to suppress a yaw rate from increasing thus stabilizing the vehicle body.

At a step 52, the CPU1 and CPU2 calculate a rear road wheel steering angle target deviation Δδ# which is a deviation between the calculated target rear road wheel steering angle $\delta_R\#$ and the read rear road steering angle $\delta_R$.

At a step 53, the CPU1 and CPU2 output a servo current IA to the HICAS motor 15 so as to derive the rear road wheel steering angle target deviation Δδ#.

Figure 5A:
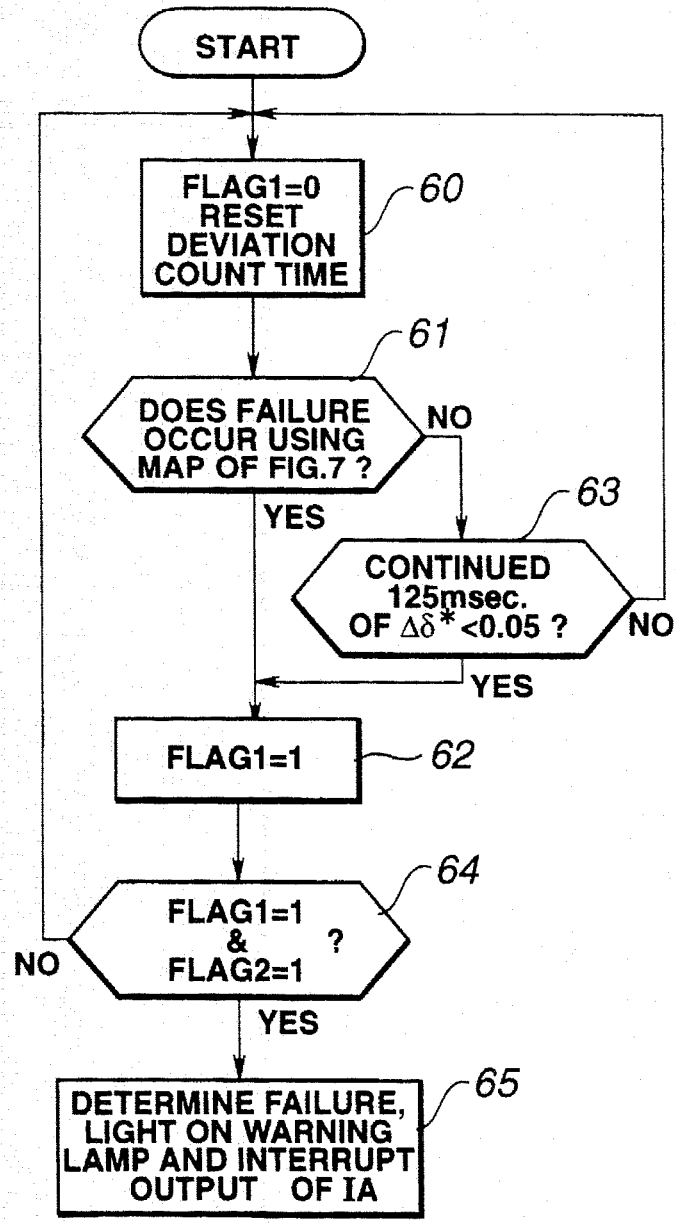
FIG. 5A and 5B are operational flowcharts of motor control current monitoring operations carried out in a monitoring circuit in a four road wheel steering control unit shown in FIG. 3.

FIG. 5A shows an operational flowchart representing an abnormality monitoring operation in the read road wheel steering angle sensor 26 carried out by means of a monitoring circuit 14d of the 4WS control unit 14.

At a step 60, a first abnormality monitoring flag FLAG1 is reset to 0 (FLAG1=0) and the duration of time during which the deviation occurs (timer) is reset to zero.

Figure 7:
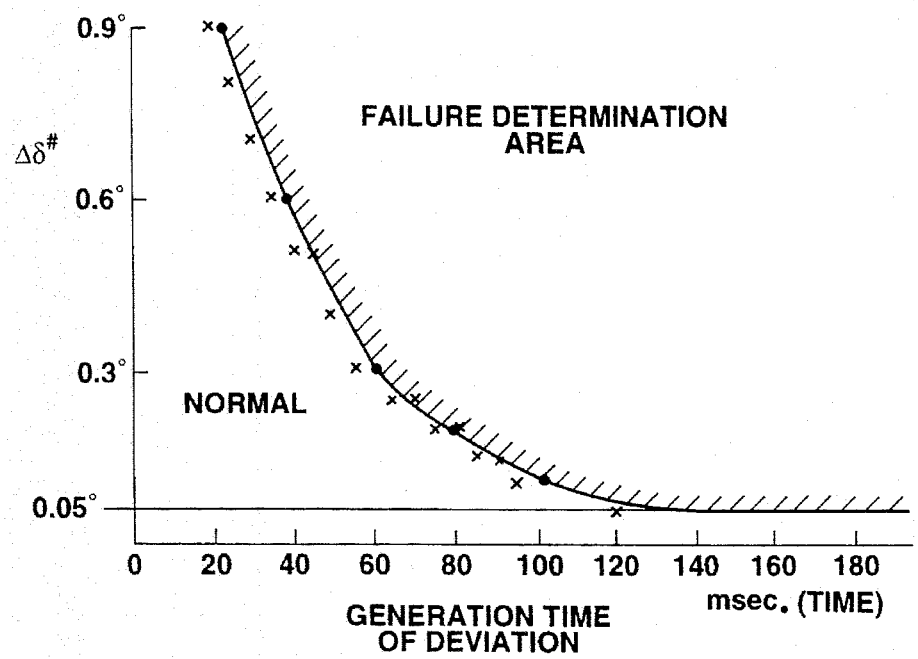
FIG. 7 is a characteristic graph representing a boundary between a failure occurrence determination and a normal operation determination used to determine the occurrence of failure in the rear road wheel steering angle sensor from the flowchart shown in FIG. 5A.

At a step 61, the CPU1 and CPU2 count the magnitude of the rear road wheel steering angle target deviation Δδ# calculated during the processing of FIG. 4 and duration of time and carry out the failure determination using the failure determination area map shown in FIG. 7.

The failure determination area map shown in FIG. 7 is previously stored and set in a memory associated with the monitoring circuit 14d.

A method for defining the failure determination area shown in FIG. 7 will be described below with reference to FIG. 6.

Figure 6:
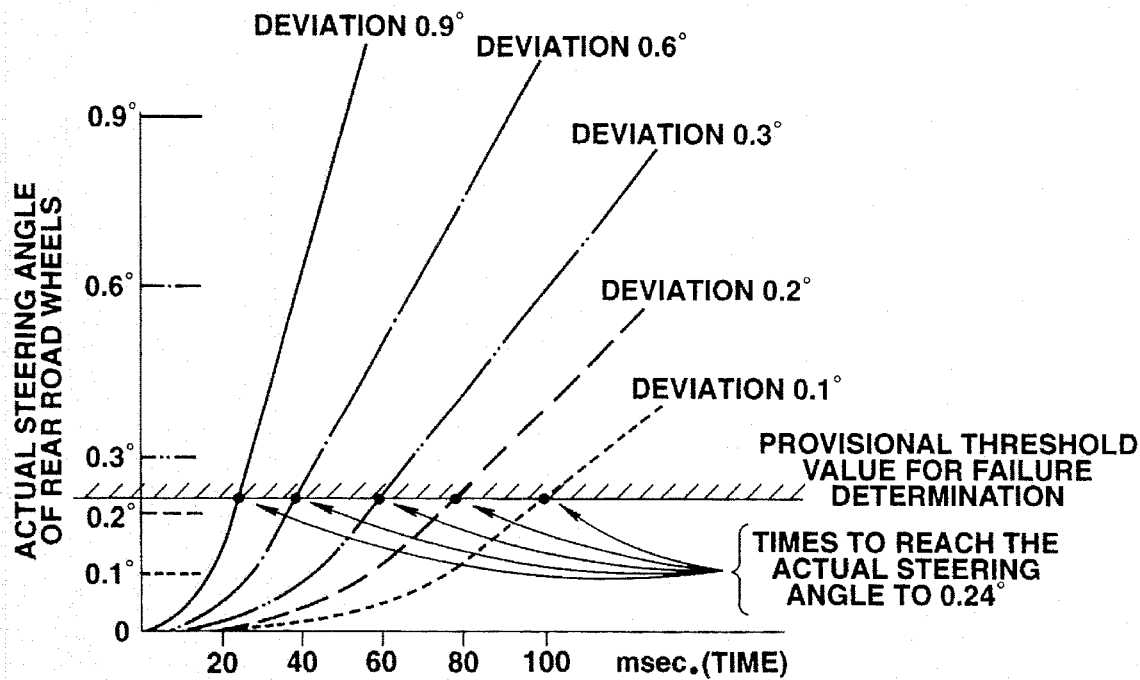
FIG. 6 is characteristic graphs representing measured times at which certain constant rear road wheel actually steering angles in a case when rear road wheel steering angle target deviations are predetermined, respectively.

As shown in FIG. 6, when the rear road steering angle target deviation Δδ# is given as 0.9°, 0.6°, 0.3°, 0.2°, and 0.1° using the vehicle in which the failure determining apparatus in the embodiment is mounted, the monitoring circuit 14d measures times at which the actual rear road wheel steering angle has reached to 0.24° (provisional failure determination threshold value) for the respective target values. The measured data are plotted on a two-dimensional plane on which the rear road wheel target deviation Δδ# is taken along a longitudinal axis and the duration of time during which the deviation occurs is taken along a lateral axis so that the plotted points are connected to a smooth curved line. It is noted that an area less than the rear road wheel steering angle target deviation Δδ# excluded from the failure determination area since a limitation of detection of failure is placed on the target deviation detection in terms of its detection accuracy.

At a step 62, since the monitoring circuit 14d determines that the output sensor signal of the rear road wheel steering angle sensor 26 falls in the failure determination area of FIG. 7 at the step 61, the first abnormality monitoring flag FLAG1 is set to FLAG1=1.

At a step 63, the monitoring circuit 14d determines whether the rear road wheel steering angle target deviation Δδ# is continued for 125 msec which indicates 0<Δδ#<0.05° which denotes a minor deviation area. If YES at the step 68, the routine goes to a step 62 in which FLAG1=1.

At a step 65, the monitoring circuit 14d determines whether both FLAG=1 and FLAG2=1. It is noted that, as described below, FLAG2 is set as in the flowchart of FIG. 5B.

At the step 65, if YES at the step 64, the monitoring circuit 14d finally determines the occurrence of failure in the rear road wheel steering angle sensor 26 commands an interruption of the servo current to the motor 15 and commands a warning lamp to turn on.

Figure 5B:
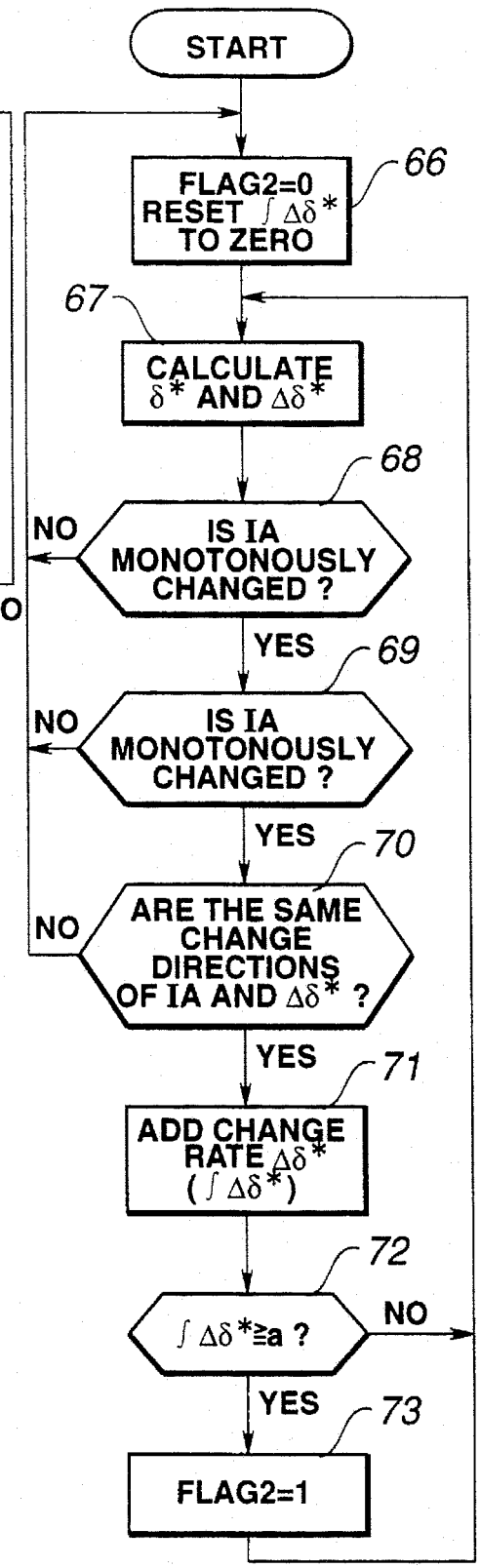

FIG. 5B shows a second sensor abnormality detection processing carried out in the monitoring circuit 14d of the 4WS control unit 14.

At a step 66, the second abnormality flag FLAG2 is reset as FLAG2=0 and an added (accumulated value) value of a rear road wheel steering angle estimated deviation ∫Δδ# is reset to zero.

At a step 87, an estimated rear road wheel steering angle $δ_R$# is calculated using the following equation (1) according to the servo current IA and actuator transfer characteristic (transfer function) and a rear road wheel steering estimated deviation Δδ# is calculated using the following equation (2) according to the estimated rear steering angle $δ_R$# and the rear road wheel steering wheel sensor value $δ_R$.

In a case where the actuator (motor) transfer characteristic is represented by a transfer function G, the estimated rear road wheel steering angle $δ_R$# is calculated as follows:

$$δ_R\# = f(IA) \cdot G \qquad (1)$$

The rear road wheel steering angle estimated deviation Δδ# is $$Δδ\# = δ_R\# - δ_R \qquad (2)$$

At a step 68, the monitoring circuit 14d determines whether the servo current IA has monotonously been varied (incremented or decremented).

At a step 69, the monitoring circuit 14d determines whether the rear road wheel steering angle estimated deviation Δδ# has monotonously been varied (incremented or decremented).

At a step 70, the monitoring circuit 14d determines whether directions of the servo current IA and rear road wheel steering angle estimated deviation Δδ# are the same.

At a step 71, the monitoring circuit 14d adds a change quantity (change rate) of the rear road wheel estimated deviation Δδ# is added to ∫Δδ# when all of the conditions of the steps 68, 69, and 70 are satisfied.

At a step 72, the monitoring circuit 14d determines whether the rear road steering wheel estimated deviation ∫Δδ# exceeds (is equal to or larger) a set threshold value a.

As shown in FIG. 4, the actual rear road wheel steering angle is controlled to derive the target rear road wheel steering angle $δ_R$# when the rear road wheel steering angle sensor 26 is normally operated.

Figure 8:
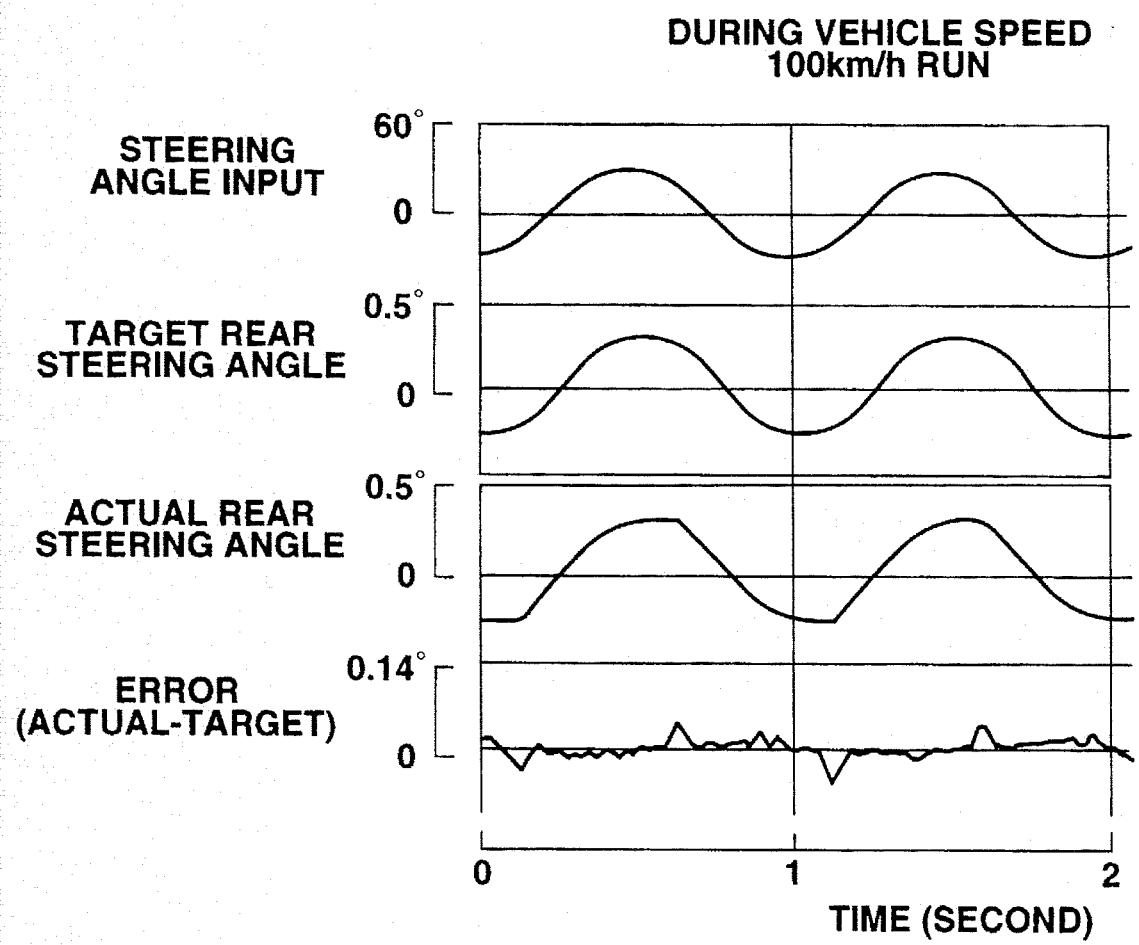
FIG. 8 is an integrally signal timing chart representing a steering wheel steered angle input from a steering angle sensor 28, a target rear steering angle, an actual rear road wheel steering angle, and an error.

FIG. 8 shows integrally a timing chart of the actual steering wheel operation input, the target rear road wheel steering angle, the actual rear road wheel steering angle, and the steering angle error (actual rear road wheel steering angle—target rear road wheel steering angle) during a slalom running at the vehicle speed of 100 km/h.

As shown in FIG. 8, if the target rear road wheel steering angle is provided in left and right directions with respect to the vehicle forward direction with a neutral position as a boundary, the actual rear road wheel steering angle is given so as to follow the target rear road wheel steering angle so that the steering error (=rear road wheel steering target deviation) is reciprocated in a minor range with a 0° position as a center.

Hence, in a case where the rear road wheel steering angle sensor 26 functions normally so as to detect accurately the actual rear road wheel steering angle, a state where the output sensor signal has the predetermined rear road wheel steering angle target deviation Δδ# is continuously generated.

In other words, when the state having the predetermined rear road wheel steering target deviation Δδ# is continuously generated, the rear steering angle sensor 26 can be regarded as an abnormal operation therein occurrence. The sensor abnormality detection processing according to the present invention is achieved with the above-described viewpoint in mind.

When the rear road wheel steering angle sensor 26 is determined to be abnormally operated (i.e., that the sensor 26 fails), the rear road wheel steering is inhibited.

$$Δδ\# \geq 0.05°: \qquad (1)$$

When the rear road wheel steering angle target deviation Δδ# is equal to or larger than 0.05°, a failure determination using the map shown in FIG. 7 carried out at the step 61.

That is to say, the following conditions are searched.

The condition such that Δδ#≧0.9° is continued for 20 msec.

The condition such that Δδ#≧0.8° continued for 25 msec.

The condition such that Δδ#≧0.7° is continued for 30 msec.

The condition such that Δδ#≧0.6° is continued for 35 msec.

The condition such that Δδ#≧0.05° is continued for 40 msec.

The condition such that Δδ#≧0.4° is continued for 50 msec.

The condition such that Δδ#≧0.3° is continued for 55 msec.

The condition such that Δδ#≧0.25° is continued for 65 msec.

The condition such that $\Delta\delta\# \geq 0.2°$ is continued for 75 msec.

The condition such that $\Delta\delta\# \geq 0.15°$ is continued for 85 msec.

The condition such that $\Delta\delta\# \geq 0.1°$ is continued for 95 msec.

The condition such that $\Delta\delta\# \geq 0.05°$ is continued for 120 msec.

If all of the above-described conditions are satisfied, the routine goes to the step 62 in which the first abnormality monitoring flag FLAG1 is set as FLAG1=1.

Then, although the second failure determination routine shown in FIG. 5B is simultaneously executed, the second abnormality monitoring flag FLAG2 is set before the set of the first abnormality flag FLAG1 since the long term continuation of the generation of the large rear road wheel steering angle target deviation $\Delta\delta\#$ occurs when the conditions recited in the step 61 are satisfied. Hence, if FLAG1=1 at the step 62, the next step 64 satisfies both conditions of FLAG1=1 and FLAG2=1 so that, at the step 65, the monitoring circuit 14d determines that the failure of the sensor 26 has occurred.

In this way, when the rear road wheel steering angle target deviation $\Delta\delta\#$ is equal to or larger than 0.05°, the determination of occurrence in failure is advanced chiefly in accordance with the first failure determination shown in FIG. 5A.

$$\Delta\delta\# \geq 0.05°: \qquad (2)$$

When the rear road wheel steering angle $\Delta\delta\#$ is less than 0.05°, the routine shown in FIG. 5A goes to the step 63 in which the condition such that $\Delta\delta\# \geq 0.05°$ is continued for 125 msec. so as to carry out the first failure determination.

At the same time, the second failure determination in accordance with the flowchart of FIG. 5B is advanced.

At the second failure determination, the servo current monotonous variation condition at the step 68, the monotonous variation condition of the rear road wheel steering angle estimated deviation at the step 69, the same directional variation condition of both servo current and rear road wheel steering angle estimated deviation at the step 72, and the rear road steering angle estimated added value condition at the step 72 are all satisfied, the routine goes to the step 73 in which the second flag FLAG2 is set as 1 (FLAG2=1). Even though the first flag FLAG1 is already set to 1 (FLAG1=1) at the step 64, the determination of the occurrence of failure in the sensor 26 is made at the step 65 to wait for the set of the second flag FLAG2 (FLAG2=1).

In the way described above, if the rear road wheel steering angle target deviation $\Delta\delta\#$ is less than 0.05°, the detection of the sensor failure is advanced chiefly in accordance with the second failure determination shown in FIG. 5B.

First Failure Determination

Since, in the first failure determination at the step 61, the method of detecting the occurrence in sensor failure is adopted on the basis of the magnitude of the rear road wheel steering target deviation $\Delta\delta\#$ and its occurrence duration in time, in the system having the single rear road wheel steering angle sensor 26, the rear road wheel steering angle sensor 26 is detected to be in failure, preventing the erroneous detection of the sensor abnormality against the instantaneous generation of the rear road wheel steering angle target deviation $\Delta\delta\#$.

In addition, since the first failure occurrence determination is based on the sensor abnormality (failure) determination area (refer to FIG. 7) represented by such a relationship between the rear road wheel steering angle target deviation $\Delta\delta\#$ and the deviation occurrence continuation duration that as the magnitude of $\Delta\delta\#$ becomes larger, the generation continuation time becomes shorter, the occurrence of failure in the rear road wheel steering angle 26 is determined at a time when the shorter deviation generation continuation time is waited (reached) with the magnitude of the deviation large and at a time when the longer deviation generation continuation time is waited (reached) with the magnitude of the deviation shorter. Thus, the determination of failure occurrence in the rear road wheel steering angle sensor 26 is made at the appropriate timing at which the actual steering angle of the rear road wheels 3 and 4 based on the deviation is suppressed to the approximately same degree of an effect given to the vehicular behavior.

Second Failure Determination

In the second failure determination shown in FIG. 5B, the method of detecting the sensor failure on the basis of the monotonous variations in the servo current IA and the rear road wheel steering angle estimated deviation $\Delta\delta\#$ and the same directional deviations is adopted, the system having the single rear road wheel steering angle sensor 26 determines the occurrence of failure in the rear road wheel steering angle sensor 26, preventing the erroneous determination of the sensor 26 according to the determination whether the rear road wheel steering angle estimated deviation added value $\int\Delta\delta\#$ is the set threshold value a for an instantaneous occurrence in the monotonous variations and the same directional variations during the normal operation of the sensor 26.

In addition, since the servo current IA output on the basis of the rear road wheel steering angle target deviation $\Delta\delta\#$ includes the rear road wheel steering angle target deviation information, the abnormality in the rear road wheel steering angle sensor 26 is detected at the appropriate timing in the same way as the first failure occurrence determination.

Furthermore, since the second determination of occurrence in failure of the rear road wheel steering angle sensor 26 is carried out on the basis of the servo current and the deviation between the estimated rear road wheel steering angle $\Delta\delta\#$ calculated according to the actuator transfer characteristic and the rear road wheel steering angle sensor value $\delta_R$, i.e., the rear road wheel steering angle estimated deviation $\Delta\delta\#$, the limitation is placed on any one of the abnormality determination modes which would generate the minor target deviation in the case of the first failure determination based on the rear road wheel steering target deviation $\Delta\delta\#$ in terms of the detection accuracy. However, in this case, the second determination of failure can achieve a higher limitation of detection accuracy since the rear road wheel steering estimated deviation $\Delta\delta\#$ is used which provides evenly the minor deviation and the accurate determination of occurrence of failure can be determined.

Failure Determination by a Combination of Both First and Second Failure Determinations In the embodiment, the first failure determination technique is used in the region in which the rear road wheel steering angle target deviation $\Delta\delta\#$ is equal to or larger than 0.05° and in which the detection accuracy is guaranteed. The second failure determination technique is used in the region in which the rear road wheel steering angle target deviation $\Delta\delta\#$ is less than 0.05°.

Thus, the common feature such that the rear road wheel steering system makes a use of the single rear road wheel steering angle sensor 26 so that the cost-effective system can be achieved is provided. In this addition, various types of the abnormality modes including the minor deviation occurrence of the rear road wheel steering angle target deviation $\Delta\delta\#$ can be responded. The abnormality in the rear road wheel steering sensor 26 is detected according to the detection timing and detection accuracy which satisfy the required performance.

Specific Examples of the Sensor Abnormality Failure

FIGS. 9A through 9D show timing charts of the respective signals when the various modes of failures in the sensor 2B occur.

FIG. 9A shows the case where a constant rear road wheel steering angle target deviation $\Delta\delta\#$ is output in response to and due to an offset failure in the sensor 26 even though (irrespective of) the target rear road wheel steering angle $\delta_R\#$ (which) gives 0°.

In this case, the second failure determination is carried out at the time when $\int\Delta\delta\#$ exceeds the threshold value a as shown in a lowest drawing of FIG. 9A. It is noted that in a case when the condition of $A\Delta\delta\#<0.05°$ is maintained, the second failure determination becomes advantageous.

FIG. 9B shows the case where a gradually increasing rear road wheel steering angle target deviation $\Delta\delta\#$ is output irrespective of 0° of the target rear road wheel steering angle $\Delta\delta_R\#$ due to, for example, a short-circuiting of one (upper side shown in FIG. 3) side of a resistor portion of the potentiometer constituting the rear road wheel steering angle sensor 26 so that the plus (positively going) bias voltage of, for example, +12 volts is applied to the variably movable center tap 26a (shown in FIG. 3) of the potentiometer. In this case, the second failure determination is carried out at a timing shown at a lowest drawing of FIG. 9B. The first determination of failure becomes advantageous in the failure mode described with reference to FIG. 9B when the rear road wheel steering angle target deviation $\Delta\delta\#$ falls in the region in which the value of $\Delta\delta\#$ is large.

FIG. 9C shows the case where the rear road wheel steering angle sensor value $\delta_R$ is maintained at zero but the constant target rear road wheel steering angle $\delta_R\#$ is calculated due to, for example, a sticky center tap 26a of the potentiometer constituting the sensor 26 so that a negative constant rear road wheel steering angle $\Delta\delta\#$ is output. In this case, the second failure determination is carried out at the timing shown in the lowest drawing of FIG. 9C. It is noted that in this failure mode and when $\Delta\delta\#<0.05°$, the second failure determination becomes advantageous.

FIG. 9D shows the case where a gradually increasing target rear road wheel steering angle $\Delta\delta_R\#$ is calculated irrespective of zero of the rear road wheel steering angle sensor 26 due to one of the failure modes, i.e., for example, due to the short-circuiting in the other side of the potentiometer constituting the sensor 28 so that the center tap 26a receives the minus (negatively going) bias voltage or, for example, due to a breakage in the potentiometer so that the center tap 26a gives an infinite impedance and a decreasing rear road wheel steering angle target deviation $\Delta\delta\#$ is output. In this case, the second failure determination is carried out at the timing shown a lowest drawing of FIG. 9D. It is noted that the first failure determination becomes advantageous when the value of the rear road wheel steering angle target deviation $\Delta\delta\#$ falls in the region in which the value off $\Delta\delta\#$ is large.

The main advantages in the diagnosing apparatus and method for determining the occurrence of failure in the sensor 28 according to the present invention will be described below:

(1) Since, in the diagnosing apparatus and method for determining the occurrence of failure in the sensor 26 is applicable to the motor-driven four wheel steering system which controls the rear road wheel steering angle through the HICAS motor 15, the diagnosing apparatus carries out the first failure determination in which the sensor failure is detected on the basis of the magnitude and generation time duration of the rear road wheel steering angle target deviation $\Delta\delta\#$, the cost-effective system having the single rear road wheel steering angle sensor 26 can be achieved and the accurate determination of failure in the sensor 26 can be made at the appropriate timing in accordance with the abnormality occurrence level affecting the rear road wheel steering angle target deviation $\Delta\delta\#$ without erroneous determination of the failure in the sensor 26.

(2) Since, in the diagnosing apparatus and method for determining the occurrence of failure in the sensor 26 is applicable to the motor-driven four wheel steering system which controls the rear road wheel steering angle through the HICAS motor 15, the diagnosing apparatus carried out the second failure determination in which the sensor failure is detected on the basis of the satisfied conditions such that same directional monotonous variations in the servo current IA and rear road wheel steering angle estimated deviation $\Delta\delta\#$ and such that the rear road wheel steering wheel estimated deviation accumulated value $\int\Delta\delta\#$ is equal to or larger than the set threshold value a, the motor-driven four wheel steering system can have the single rear road wheel steering angle sensor 26 so that the cost-effective system can be achieved and the failure in the rear road wheel steering angle sensor 26 in terms of the minor output signal offset can accurately be detected.

(3) Since, in the motor-driven four wheel steering system which controls the rear road wheel steering angle by means of the HICAS motor 15, the first failure determination technique is applied to the region in which the rear road wheel steering angle target deviation $\Delta\delta\#$ is equal to or larger than 0.05° and in which the detection accuracy is guaranteed and the second failure determination technique is applied to the minor deviation region in which the rear road wheel steering target deviation $\Delta\delta\#$ is less than 0.05°, the failure in the rear road wheel steering angle sensor 26 can be detected at the appropriate timing of detection and at the high detection accuracy which satisfy the required performance with the motor-driven four wheel steering system being cost-effective (high cost performance) and the diagnosing apparatus and method for determining the failure occurrence can be responded to various modes of failures including the occurrence of the minor deviation of the rear road wheel steering angle target deviation $\Delta\delta\#$.

The combination of the first and second failure determinations is described in the embodiment. However, the present invention is applicable to independently the first failure determination or the second failure determination.

Figure 10A:
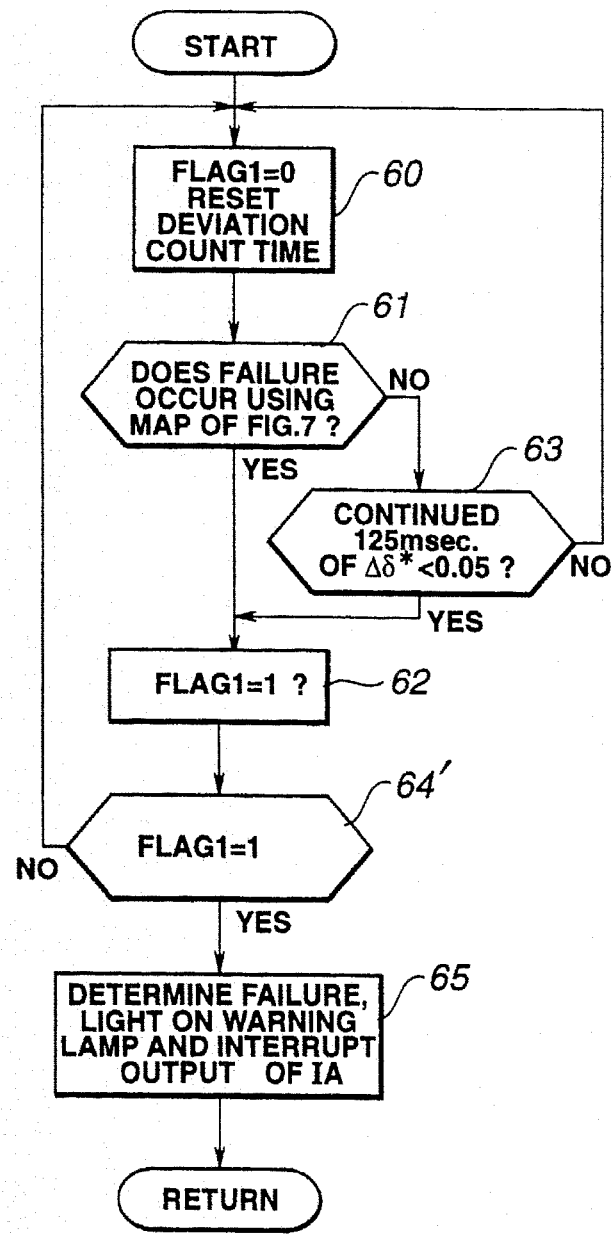
FIGS. 10A and 10B are operational flowcharts executed by the monitoring circuit as modifications of the flowcharts of FIGS. 5A and 5B, respectively.

In details, as one alternative, FIG. 10A shows the first failure determination routine in which at the step 64' the monitoring circuit 14d determines only whether FLAG1=1.

Figure 10B:
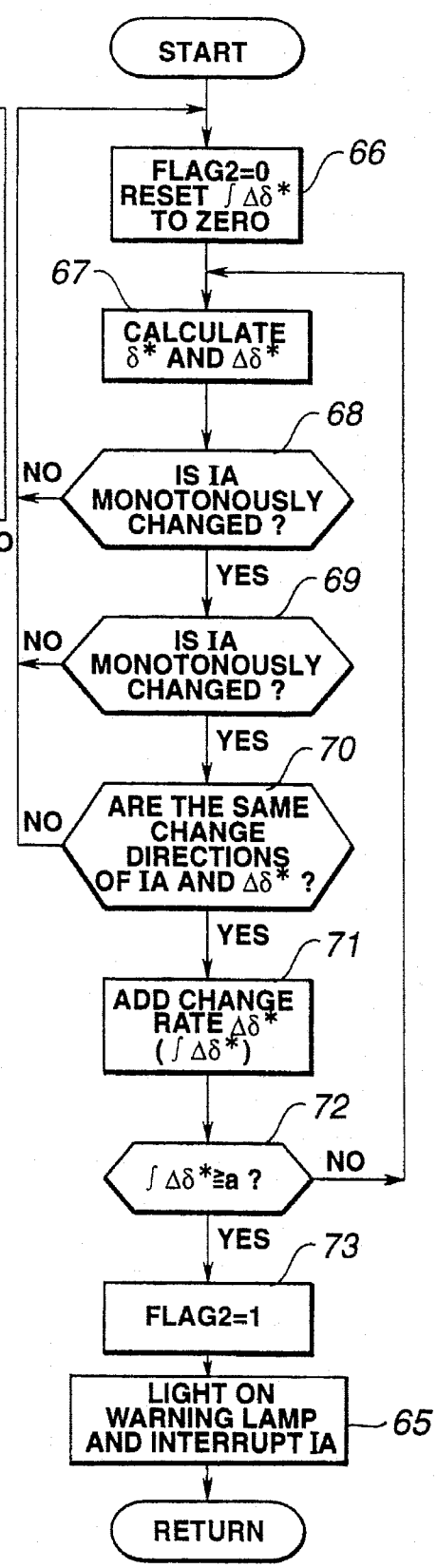

As another alternative, FIG. 10B shows the second failure determination routine in which, at next of the step 73, the content of the step 65 shown in FIG. 5A is carried out.

The invention should be understood to include all possible embodiments and modification to the shown embodiments which can be embodied without departing from the principle of the invention as set forth in the appended claims.

What is claimed is:

1. An apparatus for an automotive vehicle, comprising:
   a) an electric motor;
   b) a rear road wheel steering mechanism which is interposed between said motor and rear left and right road wheels of the vehicle and which is so constructed as to steer left and right road wheels of the vehicle through a rear road wheel steering angle in response to a rotation of said motor;
   c) detecting means for detecting an information related to a vehicular behavior condition;
   d) a rear road wheel steering angle sensor which is so constructed as to produce a sensor signal indicating a direction and magnitude of the rear road wheel steering angle said sensor signal being used as a positioning information of the rear road wheel steering angle to be controlled;
   e) rear road wheel steering angle target value calculating means for calculating a rear road wheel steering angle target value according to the detected information related to the vehicular behavior condition;
   f) rear road wheel steering angle target value deviation calculating means for calculating a target deviation value between the sensor signal value and the calculated rear road wheel angle target value;
   g) controlling means for outputting a servo current to said motor to rotate said motor so that the calculated target deviation gives zero;
   h) sensor failure determination area setting means for setting a sensor failure determination area represented by such a relationship between a magnitude of the target deviation and a generation time duration during which the target deviation continues that as the magnitude of the target deviation becomes larger, the generation time duration becomes shorter;
   i) first sensor monitoring means for monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area; and
   j) warning means for warning the occurrence of failure in the rear road wheel steering angle sensor when said first sensor monitoring means determines that the failure occurs in the rear road wheel steering angle sensor.

2. An apparatus for an automotive vehicle, comprising:
   a) an electric motor;
   b) a rear road wheel steering mechanism which is interposed between said motor and rear left and right road wheels of the vehicle and which is so constructed as to steer left and right road wheels of the vehicle through a rear road wheel steering angle in response to a rotation of said motor;
   c) detecting means for detecting an information related to a vehicular behavior condition;
   d) a rear road wheel steering angle sensor which is so constructed as to produce a sensor signal indicating a direction and magnitude of the rear road wheel steering angle said sensor signal being used as a positioning information of the rear road wheel steering angle to be controlled;
   e) rear road wheel steering angle target value calculating means for calculating a rear road wheel steering angle target value according to the detected information related to the vehicular behavior condition;
   f) rear road wheel steering angle target value deviation calculating means for calculating a target deviation value between the sensor signal value and the calculated rear road wheel angle target value;
   g) controlling means for outputting a servo current to said motor to rotate said motor so that the calculated target deviation gives zero;
   h) rear road wheel steering angle estimating means for calculating a rear road wheel steering angle estimated value of the rear road wheel steering angle provided through the rear road wheel steering mechanism when said servo current is supplied to the electric motor on the basis of a dynamic characteristic of the motor;
   i) rear road wheel steering angle estimated deviation calculating means for calculating an estimated deviation between the rear road wheel steering angle sensor signal value and the estimated value of the rear road wheel steering angle;
   j) servo current variation determining means for determining whether said servo current has monotonously varied;
   k) rear road wheel steering angle estimated deviation variation determining means for determining whether said estimated deviation is monotonously varied;
   l) variation direction determining means for determining whether directions of the respective variations in the servo current and estimated deviation are mutually the same;
   m) rear road wheel steering angle estimated deviation accumulating means for accumulating a change rate of the rear road wheel steering angle estimated deviation when such conditions as the monotonous variations in said servo current and in the rear road wheel steering angle estimated deviation and as the mutually same directional variations in the servo current and the estimated deviation are satisfied;
   n) second sensor monitoring means for determining an occurrence of failure in the rear road wheel steering angle sensor when an accumulated value of the change rate of the rear road wheel steering angle estimated deviation is equal to or larger than a predetermined threshold value; and
   o) warning means for warning the occurrence of failure in the rear road wheel steering angle sensor when said second sensor monitoring means determines that the failure in the rear road wheel steering angle sensor has occurred.

3. An apparatus for an automotive vehicle, comprising:
   a) an electric motor;
   b) a rear road wheel steering mechanism which is interposed between said motor and rear left and right road wheels of the vehicle and which is so constructed as to steer left and right road wheels of the vehicle through a rear road wheel steering angle in response to a rotation of said motor;
   c) detecting means for detecting an information related to a vehicular behavior condition;
   d) a rear road wheel steering angle sensor which is so constructed as to produce a sensor signal indicating a direction and magnitude of the rear road wheel steering angle said sensor signal being used as a positioning information of the rear road wheel steering angle to be controlled;

e) rear road wheel steering angle target value calculating means for calculating a rear road wheel steering angle target value according to the detected information related to the vehicular behavior condition;

f) rear road wheel steering angle target value deviation calculating means for calculating a target deviation value between the sensor signal value and the calculated rear road wheel angle target value;

g) controlling means for outputting a servo current to said motor to rotate said motor so that the calculated target deviation gives zero;

h) sensor failure determination area setting means for setting a sensor failure determination area represented by such a relationship between a magnitude of the target deviation and a generation time duration during which the target deviation continues that as the magnitude of the target deviation becomes larger, the generation time duration becomes shorter;

i) first sensor monitoring means for monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area;

j) rear road wheel steering angle estimating means for calculating a rear road wheel steering angle estimated value of the rear road wheel steering angle provided through the rear road wheel steering mechanism when said servo current is supplied to the electric motor on the basis of a dynamic characteristic of the motor;

k) rear road wheel steering angle estimated deviation calculating means for calculating an estimated deviation between the rear road wheel steering angle sensor signal value and the estimated value of the rear road wheel steering angle;

l) servo current variation determining means for determining whether said servo current has monotonously varied;

m) rear road wheel steering angle estimated deviation variation determining means for determining whether said estimated deviation is monotonously varied;

n) variation direction determining means for determining whether directions of the respective variations in the servo current and estimated deviation are mutually the same;

o) rear road wheel steering angle estimated deviation accumulating means for accumulating a change rate of the rear road wheel steering angle estimated deviation when such conditions as the monotonous variations in said servo current and in the rear road wheel steering angle estimated deviation and as the mutually same directional variations in the servo current and the estimated deviation are satisfied;

p) second sensor monitoring means for determining an occurrence of failure in the rear road wheel steering angle sensor when an accumulated value of the change rate of the real road wheel steering angle estimated deviation is equal to or larger than a predetermined threshold value; and q) warning means for warning the occurrence of failure in the rear road wheel steering angle sensor when at least one of said first and second sensor monitoring means determines that the failure in the rear road wheel steering angle sensor has occurred.

4. An apparatus for an automotive vehicle as claimed in claim 3 wherein said first sensor monitoring means outputs a sensor abnormality monitoring information on the basis of the failure determination according to the set sensor determination area when the rear road wheel steering angle target deviation is equal to or larger than a predetermined deviation value and said first sensor monitoring means outputs another sensor abnormality monitoring information at a time at which the generation time duration has been continued for a predetermined period of time in place of the failure determination according to the sensor failure determination area when the rear road wheel steering angle target deviation value is a minor deviation less than the predetermined deviation value, wherein said second sensor monitoring means outputs the sensor abnormality monitoring information when the estimated deviation change rate accumulated value is equal to or larger than the predetermined threshold value, and which further comprises third sensor monitoring means for determining the occurrence of failure in the rear road wheel steering angle sensor in response to the sensor abnormality monitoring informations output from both of said first and second sensor monitoring means.

5. An apparatus for an automotive vehicle as claimed in claim 4, wherein the predetermined rear road wheel steering angle target deviation value is 0.05° and the predetermined period of time is 125 msec.

6. An apparatus for an automotive vehicle as claimed in claim 5, wherein said predetermined failure determination area includes such conditions as;

whether the target deviation value $\Delta\delta\# \geq 0.9°$ has continued for 20 msec., whether $\Delta\delta\# \geq 0.8°$ has continued for 25 msec., whether $\Delta\delta\# \geq 0.7°$ has continued for 30 msec., whether $\Delta\delta\# \geq 0.6°$ has continued for 35 msec., whether $\Delta\delta\# \geq 0.5°$ has continued for 40 msec., whether $\Delta\delta\# \geq 0.4°$ has continued for 50 msec., whether $\Delta\delta\# \geq 0.3°$ has continued for 55 msec., whether $\Delta\delta\# \geq 0.25°$ has continued for 65 msec., whether $\Delta\delta\# \geq 0.2°$ has continued for 75 msec., whether $\Delta\delta\# \geq 0.15°$ has continued for 85 msec., whether $\Delta\delta\# \geq 0.1°$ has continued for 95 msec., whether $\Delta\delta\# \geq 0.05°$ has continued for 120 msec.

7. An apparatus for an automotive vehicle as claimed in claim 6, wherein said first sensor monitoring means determines the occurrence of failure in said rear road wheel steering angle sensor according to whether all of the conditions are satisfied when the rear road wheel steering angle target deviation $\Delta\delta\#$ is equal to or larger than 0.05°.

8. An apparatus for an automotive vehicle as claimed in claim 7, wherein said second sensor monitoring means starts the determination of whether the rear road wheel steering angle sensor has failed when $\Delta\delta\#$ is less than 0.05°.

9. An apparatus for an automotive vehicle as claimed in claim 8, wherein said warning means output a warning signal to a relay so that the power supply to the motor is interrupted and to a warning lamp to turn on the warning lamp.

10. An apparatus for an automotive vehicle as claimed in claim 9, wherein said rear road wheel steering angle sensor comprises a potentiometer which outputs the sensor signal according to a rotation quantity and rotation direction of an output axle of the motor.

11. A diagnosing method for a motor-driven four wheel steering system of an automotive vehicle, comprising the steps of:

a) detecting an information related to a vehicular behavior condition;

b) producing a sensor signal indicating a direction and magnitude of a rear road wheel steering angle, said sensor signal being used as a positioning information of the rear road wheel steering angle to be controlled;

c) calculating a rear road wheel steering angle target value according to the detected information related to the vehicular behavior condition;

d) calculating a target deviation value between the sensor signal value and the calculated rear road wheel angle target value;

e) outputting a servo current to said motor to rotate said motor so that the calculated target deviation gives zero;

f) setting a sensor failure determination area represented by such a relationship between a magnitude of the target deviation and a generation time duration during which the target deviation continues that as the magnitude of the target deviation becomes larger, the generation time duration becomes shorter;

g) monitoring the sensor signal value and measuring the generation time duration of the target deviation and for determining that a failure in said rear road wheel steering angle sensor has occurred when the relationship between the magnitude of the target deviation and the measured time duration belong to said set sensor failure determination area; and h) warning the occurrence of failure in the rear road wheel steering angle sensor when said first sensor monitoring means determines that the failure occurs in the rear road wheel steering angle sensor.

12. A diagnosing method for a motor-driven four wheel steering system of an automotive vehicle, comprising the steps of:

a) detecting an information related to a vehicular behavior condition;

b) producing a sensor signal indicating a direction and magnitude of a rear road wheel steering angle, said sensor signal being used as a positioning information of the rear road wheel steering angle to be controlled;

c) calculating a rear road wheel steering angle target value according to the detected information related to the vehicular behavior condition;

d) calculating a target deviation value between the sensor signal value and the calculated rear road wheel angle target value;

e) outputting a servo current to said motor to rotate said motor so that the calculated target deviation gives zero;

f) calculating a rear road wheel steering angle estimated value of the rear road wheel steering angle provided through a rear road wheel steering mechanism when said servo current is supplied to the electric motor on the basis of a dynamic characteristic of the motor;

g) calculating an estimated deviation between the rear road wheel steering angle sensor signal value and the estimated value of the rear road wheel steering angle;

h) determining whether said servo current has monotonously varied;

i) determining whether said estimated deviation is monotonously varied;

j) determining whether directions of the respective variations in the servo current and estimated deviation are mutually the same;

k) accumulating a change rate of the rear road wheel steering angle estimated deviation when such conditions as the monotonous variations in said servo current and in the rear road wheel steering angle estimated deviation and as the mutually same directional variations in the servo current and the estimated deviation are satisfied;

l) determining an occurrence of failure in the rear road wheel steering angle sensor when an accumulated value of the change rate off the rear road wheel steering angle estimated deviation is equal to or larger than a predetermined threshold value; and m) warning the occurrence of failure in the rear road wheel steering angle sensor when said second sensor monitoring means determines that the failure in the rear road wheel steering angle sensor has occurred.

* * * * *